July 13, 1926. 1,592,114

P. LEO

COMBINATION OF DRIVEN DEVICE, DRIVING MEANS, AND CONNECTIONS

Original Filed Sept. 27, 1920

Inventor
Paul Leo.
By his Attorney Geo. A. Byrne

Patented July 13, 1926.

1,592,114

UNITED STATES PATENT OFFICE.

PAUL LEO, OF ELIZABETH, NEW JERSEY, ASSIGNOR TO PACKARD MOTOR CAR COMPANY, OF DETROIT, MICHIGAN, A CORPORATION OF MICHIGAN.

COMBINATION OF DRIVEN DEVICE, DRIVING MEANS, AND CONNECTIONS.

Application filed September 27, 1920, Serial No. 413,202. Renewed May 21, 1926.

This invention relates to a combination of a driven device for driving means and connections, where some of the parts are behind a wall or the like.

The present invention provides a novel combination whereby making of a driving connection between a driving part or shaft located behind a wall or the like, and a driven part which occupies a position closing an opening in said wall, is more readily and reliably effected than heretofore.

The invention further provides a novel telescopic shaft.

Figure 1:
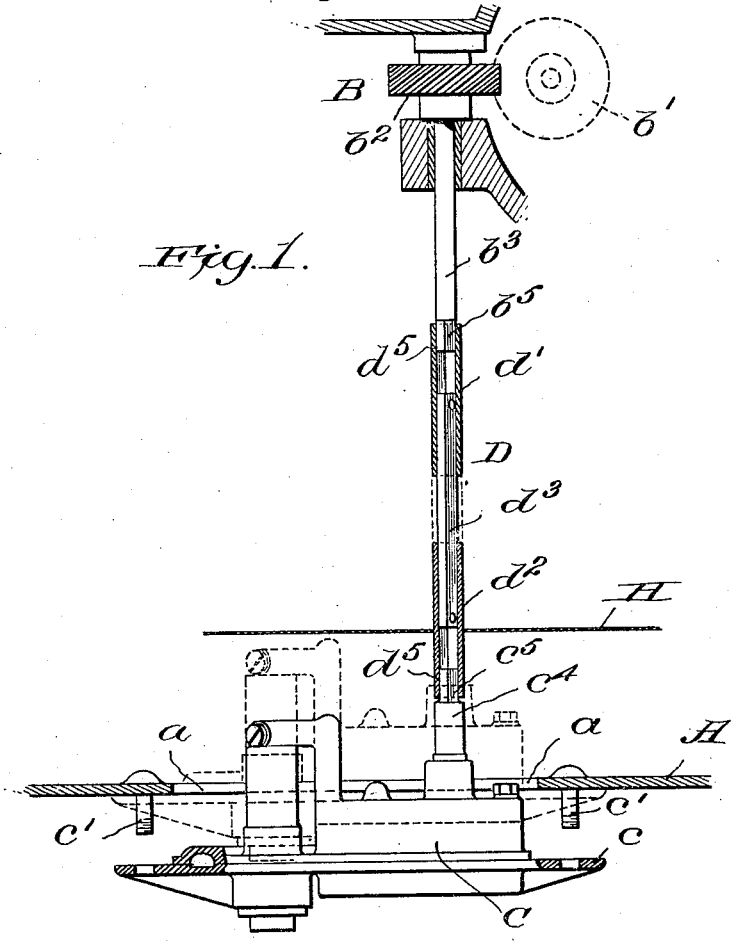

An embodiment of the invention is illustrated in the accompanying drawing, wherein, Figure 1 is a view principally in section of so much of a driving means, and driven device, and connecting shaft, as is necessary to illustrate the invention.

Figures 2, 3, 4:
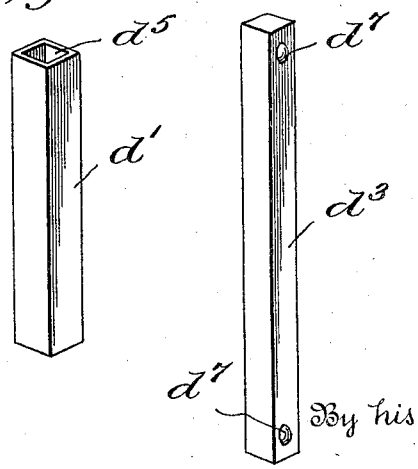
Figure 5:
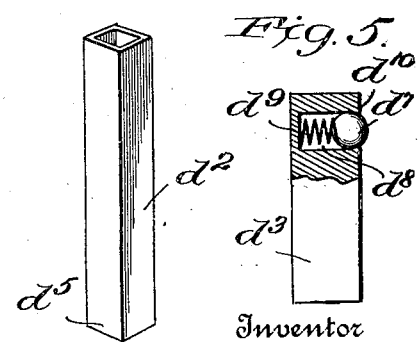

Figures 2, 3 and 4 are detail perspective views of the parts of the telescoping shaft shown in Figure 1 and Figure 5 is a detail view, partly in section, of the rod shown in Figure 2.

Referring to said drawings, A designates a wall or the like, as for example, the casing of an automobile engine, B, a driving means, which may comprise gears $b^1$, $b^2$, running off from the crank-shaft of the engine, for example, and C designates a driven device, which may be a lubricating pump, adapted to fit in and close an opening $a$ in the casing wall of the engine, the lubricating pump being commonly located in the bottom part of the automobile casing, which is used as an oil reservoir. Such a construction is found for example in the engine used in the Packard motor vehicles. The casing of the pump C conveniently has a flange $c$ which laps over the casing A around the the edges of the opening $a$, and may be fastened to the casing by means of studs $c'$ or the like, and when so fastened, the casing of the pump securely closes the opening $a$ and constitutes a part of the bottom of the automobile casing A.

D designates a telescoping shaft for connecting the driving means B and the pump or driven device C. The telescoping shaft may conveniently, and preferably does comprise a pair of tubular parts $d^1$, $d^2$, and a rod $d^3$ adapted to fit and telescope in said tubular parts $d^1$, $d^2$. The tubular parts and the rod are preferably made square, so as to prevent turning of one part on another. The tubular parts $d^1$, $d^2$ are together preferably equal in length to the distance between the points of connection of the telescoping shaft to the driving means and driven device when in place, so that the telescoping shaft may not shorten after the driven device is in place, and thereby become disconnected from the driving means.

The driving means B may comprise a shaft $b^3$, and the driven device C may comprise a short shaft $c^4$. The telescoping shaft D and the shafts $b^3$ and $c^4$ are conveniently provided with endwise clutching or connecting means, these means being conveniently provided by squared ends $b^5$, $c^5$ of the shafts $b^3$, $c^4$ and the squared ends $d^5$ of the tubular parts $d^1$, $d^2$ of the telescoping shaft D.

The parts of the telescoping shaft D are preferably made so as to bear with considerable friction on one another, so as to resist telescoping movement of the parts. This is conveniently accomplished by a novel friction device between the sleeves and rod of the telescoping shaft comprising a ball $d^7$ in a recess $d^8$ in rod $d^3$ near each end, and a spring $d^9$ behind each ball. The ball is conveniently retained in the recess by metal $d^{10}$ which is spread from the rod around the mouth of the recess by upsetting. The ball projects slightly beyond the face of the rod $d^3$ so as to bear on the inner faces of the sleeves $d^1$, $d^2$.

Beyond the wall A there may be a partition H. In a Packard motor, for example, there is a screen which forms the partition H. The telescoping shaft D in extended position projects through the partition or screen H.

In putting the driven device or lubricating pump C in place in the casing, the telescoping shaft is first extended, as shown in full lines, Figure 1 (or to a greater extent) and connection made with the squared end $b^5$ of the shaft $b^3$ of the driving means. The friction means $d^7$ resists the telescoping of the parts, and the telescoping shaft may be held connected with the shaft $b^3$ while the driven device C is brought before the opening $a$ in the casing or wall A and connection readily and certainly made between the lower end of the telescoping shaft D and the shaft $c^4$ of the pump. After the connection is made between the telescoping shaft and the pump C, the pump is moved further into place, until the flange abuts against the underside of the wall or casing A, the parts of telescoping shaft frictionally yielding, so as to telescope or shorten, and when the pump C is completely in place, the ends of the tubular parts $d^1$, $d^2$ preferably abut, as shown in dotted lines in Figure 1, thereby preventing further telescoping movement of the shaft, and consequently preventing the end of the telescoping shaft from moving out of clutch or connection with the end of shaft $b^5$. The studs $c^1$ may be used to fasten the pump in place.

In prior structures, it has been customary, in assembling the parts, to first connect an intermediate shaft to the shaft of the driving means, rest its edge on the edge of the screen H, and make a blind movement of the pump C toward the intermediate shaft to connect the intermediate shaft and driven part. In practice this ordinarily requires a number of trials, and consumes considerable time. Moreover careless or uninstructed workmen frequently fail to make the connection in assembling the parts, the consequence of which is that the pump fails to force the distribution of the lubricating oil, and in many cases damage to the bearings of the vehicle occurs before the cause of the damage is discovered.

The specific details of construction may be changed without departing from the spirit of the invention.

Having thus described my invention and the manner in which it is performed, I declare that what I claim is:—

1. In combination, a driving means, a driven device and a telescoping shaft for connecting said driving means and driven device, adapted to be extended to readily permit connection being made with said driving means and to telescope or shorten as said driven device is brought toward said driving means, said telescoping shaft comprising tubular frictionally yielding parts having a combined length equal to the distance between the points of connection of said shaft to said driving means and said driven device when in place.

2. In combination, a driving means comprising a shaft, a driven device, and a telescoping shaft for connecting the shaft of said driven means and said driven device, endwise engaging clutching or connecting means between said telescoping shaft and said driven device and said shaft of said driving means, the parts of said telescoping shaft having a frictional and rigid bearing whereby the parts retain a position to which extended and offer a resistance to telescoping and are adapted to be extended to readily permit connection being made with said driving means shaft, and permit of being held in connection with the clutching means of said driving means shaft while the connection is being made between the driven device and telescoping shaft, said telescoping shaft being adapted to frictionally yield and shorten as said driven device is brought toward said driving means.

Signed at New York in the county of New York and State of New York this 24th day of September A. D. 1920.

PAUL LEO.